Aug. 2, 1949.    M. L. CRANDALL    2,477,723
SAFETY PIN
Filed July 27, 1944
Fig. 2
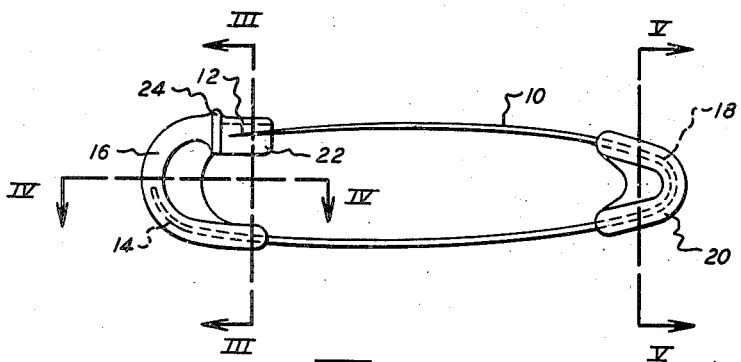
Fig. 1
 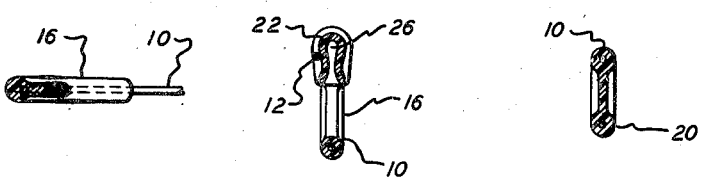 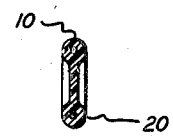
Fig. 4.    Fig. 3.    Fig. 5.
Inventor
MERTON L. CRANDALL
By Beaman + Langford
Attorneys Patented Aug. 2, 1949

2,477,723

UNITED STATES PATENT OFFICE 2,477,723

SAFETY PIN

Merton L. Crandall, Hudson, Mich.

Application July 27, 1944, Serial No. 546,803

1 Claim. (Cl. 24—156)

The present invention relates to improvements in safety pins, being particularly adapted to pins of the construction and operation disclosed in my United States Patent No. 2,084,480, granted June 22, 1937.

It is an object of the present invention to improve the construction of safety pins of the above identified type by eliminating the use of sheet metal stampings through the employment of a molded plastic construction.

Another object of the present invention is to provide a safety pin fabricated from a plain open ended wire loop having a head molded on one end of the open end of the wire loop and a tail piece molded at the closed end of the loop.

A still further object of the invention is to provide a safety pin of the type described in which the tail piece is of resilient molded material.

A still further object of the invention is to provide a safety pin of the type described having a resilient pin portion in the form of a loop and a resilient molded tail portion encasing the closed end of the loop.

A still further object of the invention is to provide a pin structure having a resilient metal portion with a part thereof embedded in a structure of resilient molded material.

These and other objects and advantages residing in the present invention will be more apparent from a consideration of the following specification and attached claim.

In the drawing,

Fig. 1 is a side elevational view of my improved safety pin shown in its open position, Fig. 2 is a plan view of Fig. 1, Fig. 3 is a cross-sectional view taken on line III—III of Fig. 1, Fig. 4 is a cross-sectional view taken on line IV—IV of Fig. 1, and Fig. 5 is a cross-sectional view of the tail piece taken on line V—V of Fig. 1.

In the illustrated embodiment of the invention, the safety pin comprises a resilient wire portion 10 in the form of a flat elongated loop having a sharpened end portion 12 and an opposite end portion 14, the latter being molded in a plastic head portion 16. The closed end 18 of the spring metal wire loop is embedded in a tail piece 20 which is preferably of resilient molded plastics material. Preferably the tail piece 20 is molded from a thermoplastic material, sufficiently plasticized to impart thereto resilient properties which will augment to some degree the resiliency of the spring metal loop 10.

As illustrated, the sharpened point 12 of the safety pin is in its open unstressed position which, because of the construction of my type of safety pin as more fully disclosed in the above identified patent, causes the point to be positioned adjacent the outside of the latched portion 22 with the point protected by the rib 24. When the safety pin is closed, the point 12 is positioned in the restricted throat portion 26. By molding the head piece 16 and tail piece 18 on the resilient wire loop 10, a more attractive and sanitary product results. By employing thermoplastic materials with injection molding, the safety pin may be turned out inexpensively and in large quantities. Also, by selecting thermoplastic materials and rubber compounds which are sufficiently plasticized to have resilient properties, the resiliency of the spring metal loop pin is augmented by the molded tail piece 20 which embraces the closed end of the loop 10. It will further be appreciated that by resiliently encasing the closed end 18 of the tail piece 20 that the loop 10 is stiffened and the positioning of the pointed end 12 when the pin is in the open position, as more clearly shown in Figs. 1 and 3, is more accurately assured.

While it is to be understood that the present invention is particularly adapted to the form of safety pin shown in my aforesaid patent, it is anticipated that one of the features of my invention, namely, the augmenting of the resiliency of the looped end portion in a resilient molded material has application to pin and fastener constructions other than the type described in my patent.

It is further to be understood that the plastic head and tail portion may be preformed before being applied to the wire and then applied by heat and pressure.

Having thus described my invention what I desire to secure by Letters Patent and claim is:

A fastener element comprising a pin portion of resilient spring metal shaped in the form of a flat, elongated, open loop with two leg portions, one leg of the loop forming a sharpened end portion, a head portion located at one end of the other leg portion to co-act with said sharpened end portion, and a resilient plastic tail in which the closed end of said loop and a substantial portion of said legs adjacent thereto are imbedded in integral relation to support the loop and augment its resiliency.

MERTON L. CRANDALL.

REFERENCES CITED

The following references are of record in the file of this patent:

UNITED STATES PATENTS

| Number | Name | Date |
|---|---|---|
| 657,088 | Conover | Sept. 4, 1900 |
| 1,884,525 | Bautista | Oct. 25, 1932 |
| 2,084,480 | Crandall | June 22, 1937 |
| 2,286,216 | Mantz | June 16, 1942 |